Patented Oct. 5, 1937

2,094,671

UNITED STATES PATENT OFFICE

2,094,671

COMPOSITION OF MATTER SUITABLE FOR A DENTIFRICE

Paul Poetschke, Bronxville, N. Y.

No Drawing. Application April 4, 1936, Serial No. 72,749

6 Claims. (Cl. 167—93)

This invention relates to a composition of matter, suitable for a dentifrice and is herein disclosed as a powder, yielding a cleansing mixture which may be neutral in reaction when added to water.

A good dentifrice must be non-caustic to the gums and mucous membrane, free from decalcifying or scratching action on the teeth, and non-poisonous. It further must not inhibit the secretion of saliva nor alter the reaction of the saliva, must be an efficient cleaner, must have an acceptable taste, and should be antiseptic and a deodorant.

Some of these desired qualities are inherent in all dentifrices but all the many dentifrices commercially available are unsatisfactory in that they lack or are seriously deficient in one or more of the desired properties. It has been supposed, for example, that the oxygen-yielding chemical perborate of soda might form the basis of a nearly perfect dentifrice, but it has been found that a substantial percentage of people are supersensitive to sodium-perborate and are "chemically burned" by it. Moreover, it has not been found to be satisfactorily antiseptic when used unintelligently as a mouth wash. Various objections to its indiscriminate use are set forth in Journal of American Dental Association for October, 1935, beginning on page 1761.

Sodium perborate has also been found under some conditions of climate to cause objectionable caking and even liquefying of some preparations hitherto used.

According to the present invention the foregoing and other objections are overcome and a safe and harmless preparation is obtained which cleans and whitens the teeth, deodorizes the breath, polishes the teeth without scratching the enamel, yet cannot injure the mucous membrane nor alter the salivary secretion.

Other features and advantages will hereinafter appear.

In the form of the invention described herein in some detail a powder is prepared carrying alkali metal perborate usually sodium perborate, and a mono-basic phosphate of an alkaline earth metal.

To avoid the possibility of caking, the perborate of soda may be used in the form of the mono-hydrate instead of the ordinary perborate of soda which contains four molecules of water. It is found that the mono-hydrate is stable in the presence of these acid salts, free from caking and also dissolving readily.

When perborate of soda dissolves in water it ordinarily forms the highly corrosive caustic soda which causes many of the ills enumerated in the magazine referred to above. In the presence of these acid salts the caustic soda is neutralized at once.

The mono-basic phosphates of the alkaline earth metals, when neutralized by the caustic soda, form colloidal or amorphous precipitates adapted to serve as a cleaning or polishing agent. Monocalcium phosphate has been found highly serviceable for all these purposes. It reacts immediately in water with the caustic soda formed neutralizing it and the proportions of perborate and phosphate are easily adjustable to produce a mixture of any desired acidity or alkalinity, or a neutral mixture. Thus the pH value of 6. to 6.64 of saliva is easily matched.

Dissolved in water the calcium phosphate and perborate yield a milky fluid, containing hydrogen peroxide, compounds of boron, and phosphates. The commercial perborate and commercial phosphates vary slightly from the theoretical formulas established for these substances and it will be found advisable to adjust the proportions of phosphate and perborate.

It is found that the taste is improved by adding about four per cent of salt, and further made agreeable to many people by adding a fraction of a per cent of soluble saccharin and a little more oil of peppermint. One very satisfactory powder was made of the following materials:

|  | Parts |
| --- | --- |
| Monocalcium phosphate | 58 |
| Monohydrated sodium perborate | 40 |
| Common salt | 4 |
| Soluble saccharin | ½ |
| Oil of peppermint | 1½ |

Such a mixture may also include an added suitable polishing agent for teeth to supplement the above-described precipitated calcium phosphate. Among suitable agents to add are certain kinds of calcium carbonate and phosphate, of magnesium carbonate and phosphate, amorphous silica and amorphous aluminum hydrate.

It has also been found possible to substitute anhydrous sodium perborate for the mono-hydrate in equi-molecular proportions with almost equally good results.

Having thus described certain embodiments of the invention, what is claimed is:

1. A composition suitable for use as a dentifrice including an alkali metal perborate and a monobasic phosphate of an alkaline earth metal.

2. A composition suitable for use as a dentifrice consisting principally of an alkali metal perborate and a monobasic phosphate of an alkaline earth metal.

3. A composition suitable for use as a dentifrice including an alkali metal perborate and a monobasic phosphate of an alkaline earth metal, said composition containing sufficient of the monobasic phosphate to insure the liberation of substantially all of the available oxygen in the perborate in aqueous media.

4. A composition suitable for use as a dentifrice consisting principally of an alkali metal perborate and a monobasic phosphate of an alkaline earth metal, said composition containing sufficient of the monobasic phosphate to insure the liberation of substantially all of the available oxygen in the perborate in aqueous media.

5. A composition suitable for use as a dentifrice including sodium perborate and monocalcium acid phosphate.

6. A composition suitable for use as a dentifrice including sodium perborate and monocalcium acid phosphate, said composition containing sufficient acid phosphate to insure the liberation of substantially all of the available oxygen in the perborate in aqueous media.

PAUL POETSCHKE.